United States Patent
Nambara

(10) Patent No.: US 9,423,616 B2
(45) Date of Patent: Aug. 23, 2016

(54) HEAD-UP DISPLAY DEVICE AND COMBINER THEREOF

(71) Applicant: DENSO CORPORATION, Kariya, Aichi-pref. (JP)

(72) Inventor: Takahiro Nambara, Toyohashi (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/650,011

(22) PCT Filed: Nov. 27, 2013

(86) PCT No.: PCT/JP2013/006961
§ 371 (c)(1),
(2) Date: Jun. 5, 2015

(87) PCT Pub. No.: WO2014/087608
PCT Pub. Date: Jun. 12, 2014

(65) Prior Publication Data
US 2015/0338649 A1    Nov. 26, 2015

(30) Foreign Application Priority Data
Dec. 7, 2012   (JP) ................................ 2012-268619

(51) Int. Cl.
*G02B 27/14* (2006.01)
*G02B 27/01* (2006.01)
*B60K 35/00* (2006.01)

(52) U.S. Cl.
CPC ............ *G02B 27/0101* (2013.01); *B60K 35/00* (2013.01); *G02B 2027/013* (2013.01); *G02B 2027/0121* (2013.01)

(58) Field of Classification Search
CPC ................... G02B 27/0101; G02B 2027/0121; G02B 2027/013; G02B 2027/0103; G02B 2027/0196; G02B 2027/01; B60K 35/00

USPC ........................ 345/7–9; 359/13, 14, 629–633
See application file for complete search history.

(56) References Cited

U.S. PATENT DOCUMENTS 5,013,134 A   5/1991   Smith
5,812,332 A   9/1998   Freeman
(Continued)

FOREIGN PATENT DOCUMENTS

JP   H02279437 A   11/1990
JP   H03209210 A   9/1991
(Continued)

OTHER PUBLICATIONS

International Search Report and Written Opinion (in Japanese with English Translation) for PCT/JP2013/006961, mailed Jan. 14, 2014; ISA/JP.
(Continued)

*Primary Examiner* — Mahidere Sahle
(74) *Attorney, Agent, or Firm* — Harness, Dickey & Pierce, P.L.C.

(57) ABSTRACT

An optical display image is projected from a projector to a combiner. The combiner includes a front reflection surface, which is in a form of a curved concave surface and forms a front surface virtual image by reflecting the optical display image at a side of the combiner where an inside of a cabin is located, and a back reflection surface, which is in a form of a curved convex surface and forms a back surface virtual image by reflecting the optical display image at another side of the combiner where an outside of the cabin is located. Optical axes, which extend from the front reflection surface and the back reflection surface, respectively, to a predicted eye point of the occupant, are overlapped with each other, and a radius of curvature of the front reflection surface is smaller than a radius of curvature of the back reflection surface.

6 Claims, 4 Drawing Sheets

(56) References Cited

U.S. PATENT DOCUMENTS

| | | |
|---|---|---|
| 6,414,796 B1 | 7/2002 | Muromachi et al. |
| 2001/0044010 A1 | 11/2001 | Freeman |
| 2002/0008926 A1 | 1/2002 | Freeman |
| 2004/0109251 A1 | 6/2004 | Freeman |
| 2005/0158520 A1 | 7/2005 | Freeman |
| 2013/0188260 A1 | 7/2013 | Matsushita et al. |

FOREIGN PATENT DOCUMENTS

| | | |
|---|---|---|
| JP | H07195959 A | 8/1995 |
| JP | 2011207645 A | 10/2011 |
| JP | 2012058688 A | 3/2012 |
| WO | WO-9963389 A1 | 12/1999 |

OTHER PUBLICATIONS

Office Action in Corresponding JP Application No. 2012-268619 mailed Mar. 31, 2015 (in Japanese with English Translation).

HEAD-UP DISPLAY DEVICE AND COMBINER THEREOF

CROSS REFERENCE TO RELATED APPLICATIONS

This application is a U.S. National Phase Application under 35 U.S.C. 371 of International Application No. PCT/JP2013/006961 filed on Nov. 27, 2013 and published in Japanese as WO 2014/087608 A1 on Jun. 12, 2014. This application is based on and claims the benefit of priority from Japanese Patent Application No. 2012-268619 filed on Dec. 7, 2012. The entire disclosures of all of the above applications are incorporated herein by reference.

TECHNICAL FIELD

The present disclosure relates to a head-up display device (hereinafter referred to as an HUD device), which displays a virtual image of an optical display image in a manner that enables visual recognition of the virtual image by an occupant.

BACKGROUND ART

Previously, there is known an HUD device that includes a display member, which transmits an external image located at an outside of a cabin of a vehicle, such as an automobile, in a manner that enables visual recognition of the external image by an occupant located in an inside of the cabin, and a projector, which projects an optical display image onto the display member.

In the HUD device recited in the Patent Literature 1, a front reflection surface, which forms a virtual image by reflecting an optical display image at an interior side of a cabin, and a back reflection surface, which forms a virtual image by reflecting the optical display image on an exterior side of the cabin, are formed in a display member. A cross section of the display member is configured such that an optical axis of the image, which is projected from the front reflection surface to an eye point of the occupant, and an optical axis of the image, which is projected from the back reflection surface to the eye point of the occupant, are overlapped with each other. Thereby, visual misalignment (double vision) of the virtual images respectively formed by the reflection surfaces can be limited to improve visual recognition of the optical display image.

However, in the HUD device of the Patent Literature 1, a radius of curvature of the back reflection surface, which is configured into a form of a curved convex surface, is smaller than a radius of curvature of the front reflection surface, which is configured into a form of a curved concave surface, so that due to a convex lens effect, an imaging point of an external image is placed closer in comparison to imaging points of the virtual images respectively formed by the reflection surfaces. As a result, when the occupant focuses on the positions of the virtual images respectively formed by the reflection surfaces, simultaneous visual recognition of the external image, which has the closer imaging point, becomes difficult, thereby being not desirable.

Patent Literature 1: JP2012-58688A

SUMMARY OF INVENTION

The present disclosure is made in view of the above disadvantage. Thus, it is an objective of the present disclosure to provide an HUD device, which improves simultaneous visual recognition capability for an optical display image and an external image.

In order to achieve the above objective, according to the present disclosure, there is provided a head-up display device that includes a display member, which transmits an external image located at an outside of a cabin of a vehicle to enable visual recognition of the external image by an occupant located in an inside of the cabin, and a projector, which projects an optical display image onto the display member to display a virtual image of the optical display image in a manner that enables visual recognition of the virtual image by the occupant. The display member includes: a front reflection surface, which is in a form of a curved concave surface and forms a front surface virtual image as the virtual image by reflecting the optical display image at a side of the display member where the inside of the cabin is located; and a back reflection surface, which is in a form of a curved convex surface and forms a back surface virtual image as the virtual image by reflecting the optical display image at another side of the display member where the outside of the cabin is located. An optical axis of the optical display image, which is reflected by the back reflection surface and is outputted from the front reflection surface, and an optical axis of the optical display image, which is reflected by the front reflection surface, are coaxial with each other and extend to a predicted eye point, which is predicted in advance as an eye point of the occupant. A radius of curvature of the front reflection surface at a reflection point of the front reflection surface, at which the optical axis of the optical display image reflected by the front reflection surface is located, is smaller than a radius of curvature of the back reflection surface at a reflection point of the back reflection surface, at which the optical axis of the optical display image reflected by the back reflection surface is located.

DESCRIPTION OF EMBODIMENTS

Hereinafter, an embodiment of the present disclosure will be described with reference to the accompanying drawings.

Figure 1:
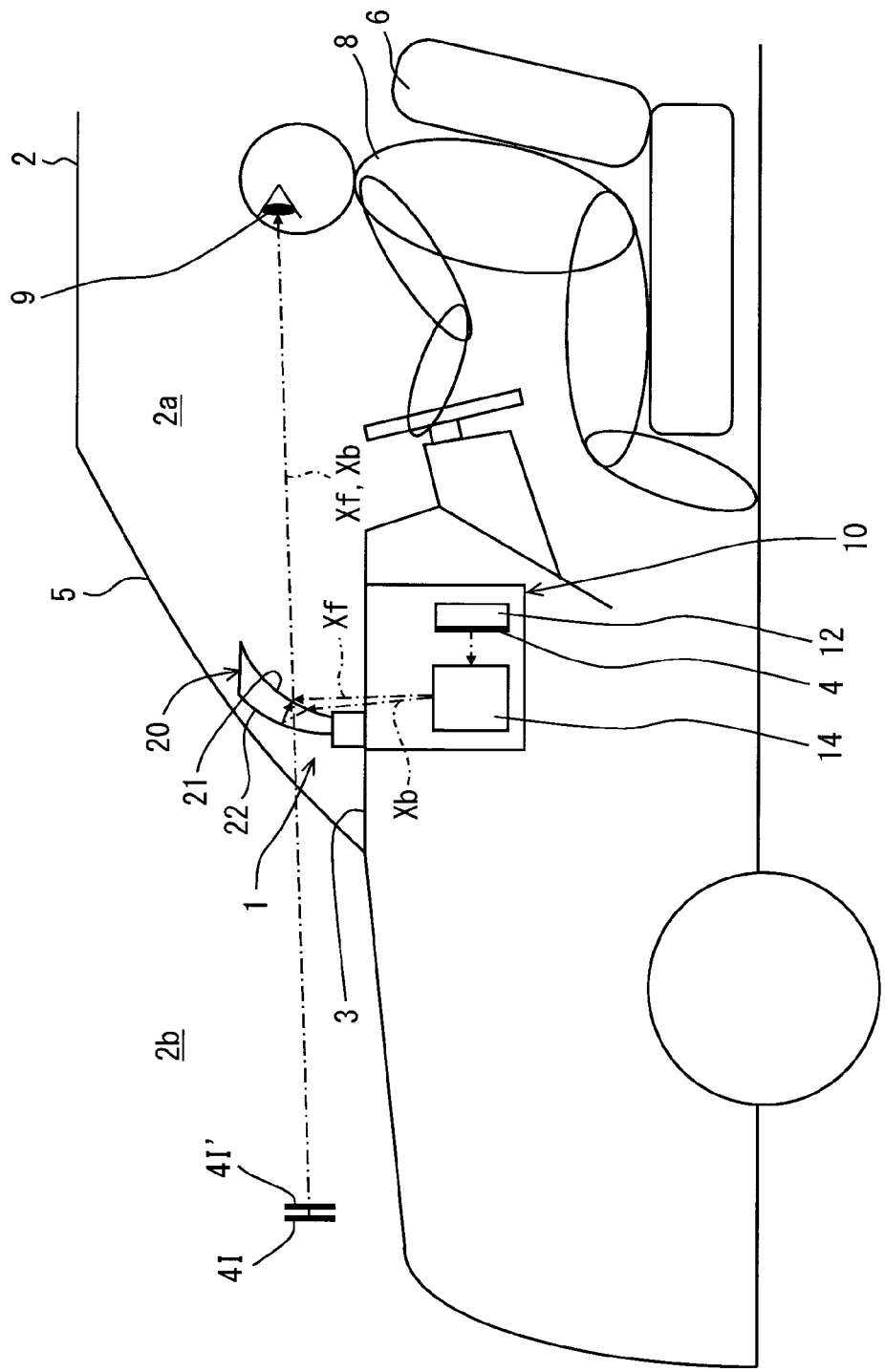
FIG. 1 is a view showing a structure of an HUD device according to an embodiment of the present disclosure.
Figure 2:
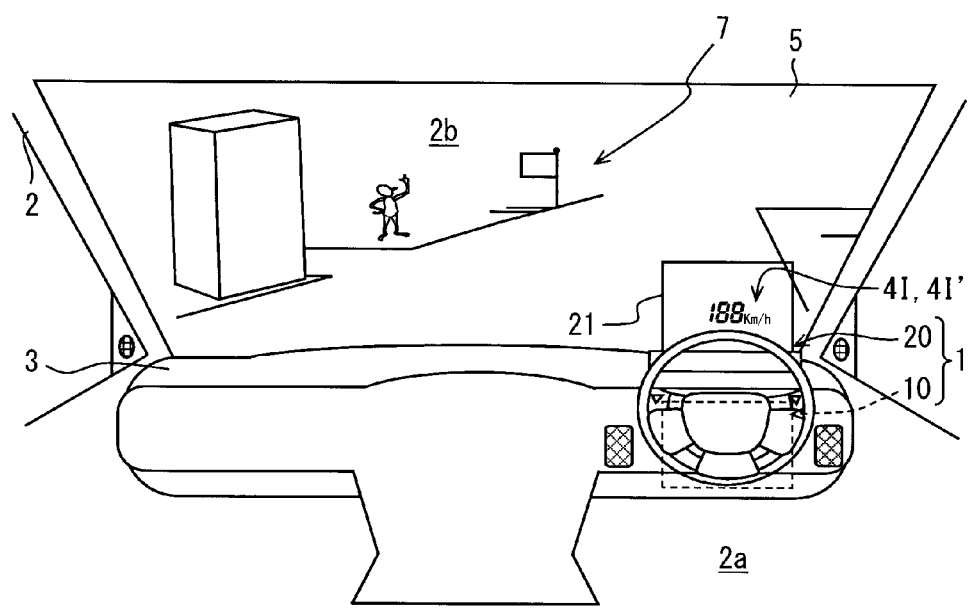
FIG. 2 is a schematic view indicating a display state of the HUD device of FIG. 1.

As shown in FIGS. 1 and 2, an HUD device 1 according to the embodiment of the present disclosure is installed in an automobile 2 (serving as a vehicle) and is received in an instrument panel 3. The HUD device 1 includes a projector 10 and a combiner 20 (serving as a display member).

As shown in FIG. 1, the projector 10 is formed by combining an optical system 14, such as a mirror(s) and a lens(es), to a display device 12, such as a liquid crystal panel. An image, which is displayed on the display device 12, is inputted to the optical system 14 as an optical display image 4, so that the image is projected in a cabin region 2a of the automobile 2 through the optical system 14.

The combiner 20 is made of transparent resin and is configured into a plate form. The combiner 20 is placed on a driver seat 6 side of a windshield 5 in the cabin region 2a. Although the combiner 20 of the present embodiment is placed such that the combiner 20 is spaced from the windshield 5 toward the driver seat 6 side, the combiner 20 may be installed to the windshield 5. With the above-described construction, the combiner 20 transmits an external image 7 (see FIG. 2) of an outdoor region 2b, which is located on a fore side of the automobile 2, to enable visual recognition of the external image 7 by an occupant 8 who is present on the driver seat 6 in the cabin region 2a.

The combiner 20 has a front reflection surface 21, which is located at a cabin region 2a side of the combiner 20, and a back reflection surface 22, which is located at an outdoor region 2b side of the combiner 20. The combiner 20 is placed along an optical axis of the optical display image 4, which is projected from the projector 10, so that the combiner 20 reflects the optical display image 4 by the respective reflection surfaces 21, 22. As a result, the optical display image 4, which is reflected by the front reflection surface 21, enters a pupil 9 of the occupant 8 and is thereby recognizable by the occupant 8 as a front surface virtual image 4I, which is imaged on the fore side (a side opposite from the driver seat 6) of the combiner 20. Also, the optical display image 4, which is reflected by the back reflection surface 22, enters the pupil 9 and is thereby recognizable by the occupant 8 as a back surface virtual image 4I', which is imaged on the fore side of the combiner 20 and is overlapped with the front surface virtual image 4I.

(Reflection Surface Configuration)

Figure 3:
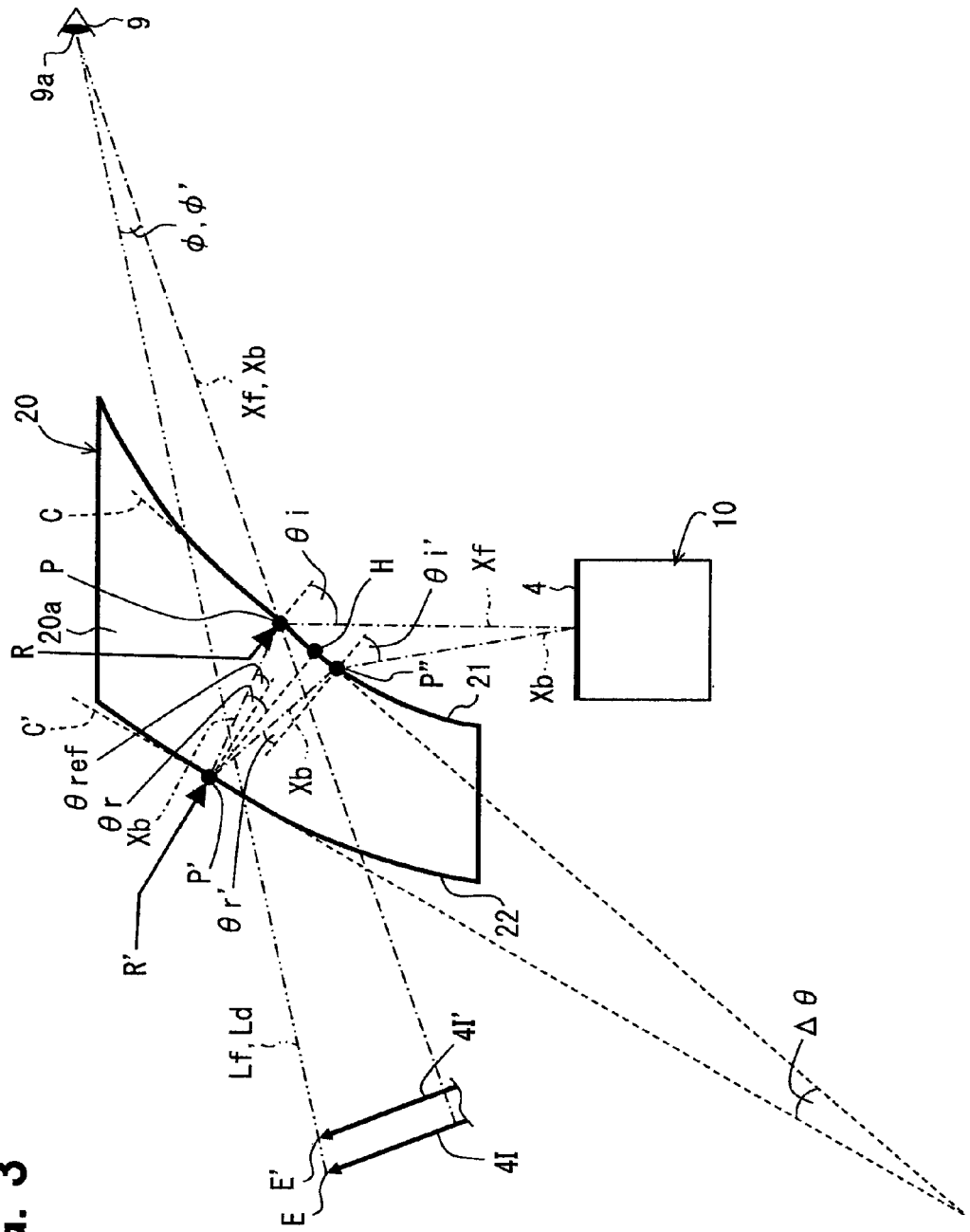
FIG. 3 is a cross-sectional view showing a characteristic feature of the HUD device of FIG. 1.

As shown in FIG. 3, the front reflection surface 21, which forms the front surface virtual image 4I, is formed by a free-form surface, such as an aspheric surface, which is configured in a form of a curved concave surface that is recessed toward an opposite side, which is opposite from the driver seat 6. In contrast, the back reflection surface 22, which forms the back surface virtual image 4I', is formed by a free-form surface, such as an aspheric surface, which is configured in a form of a curved convex surface that is protruded toward the opposite side, which is opposite from the driver seat 6.

(Setting of Wedge Angle)

In a cross section 20a of the combiner 20, which is shown in FIG. 3 and is taken along a top-to-bottom direction, i.e., in a vertical cross section of the combiner 20 that extends along an optical axis Xf of the optical display image 4 reflected by the front reflection surface 21 and an optical axis Xb of the optical display image 4 reflected by the back reflection surface 22, the front reflection surface 21 and the back reflection surface 22 are arranged such that a wedge angle $\Delta\theta$, which is widened toward an obliquely upward side, is interposed between a tangent line C, which extends through a reflection point P of the front reflection surface 21 wherein the optical axis Xf is located, and a tangent line C', which extends through a reflection point P' of the back reflection surface 22 where the optical axis Xb is located. The combiner 20, which has the wedge angle $\Delta\theta$ held between the front reflection surface 21 and the back reflection surface 22, is configured into a wedge form that has a thickness, which continuously increases from a lower end to an upper end of the wedge form. Here, particularly, in the present embodiment, the wedge angle $\Delta\theta$ is set such that the optical axis Xf, which extends from the reflection surface 21 to a predetermined predicated eye point 9a, and the optical axis Xb, which extends from the reflection surface 22 to the predetermined predicted eye point 9a, overlap with each other (meet with each other) on a side of the reflection point P where the predicted eye point 9a is placed, as indicated by dot-dash lines in FIG. 3. In other words, the optical axis Xb of the optical display image 4, which is reflected by the back reflection surface 22 and is outputted from the front reflection surface 21, and the optical axis Xf of the optical display image 4, which is reflected by the front reflection surface 21, are coaxial to each other and extend to the predicted eye point 9a. The cross section 20 of the combiner 20 includes both of the reflection point P of the front reflection surface 21, at which the optical axis Xf of the optical display image 4 reflected by the front reflection surface 21 is located, and the reflection point P' of the back reflection surface 22, at which the optical axis Xb of the optical display image 4 reflected by the back reflection surface 22 is located, and the tangent line C, which is tangent to the reflection point P of the front reflection surface 21 in the cross section 20a of the combiner 20, and the tangent line C', which is tangent to the reflection point P' of the back reflection surface 22 in the cross section 20 of the combiner 20, cross with each other at a predetermined angle (specifically the wedge angle $\Delta\theta$). The predicted eye point 9a is a center position of the pupil 9, which is predicted in advance according to the specification of the automobile 2 for the occupant 8 who is present on the driver seat 6.

Specifically, the wedge angle $\Delta\theta(°)$ satisfies the following equation (1) between an incident angle $\theta r$ of the optical axis Xb of the optical display image 4, which proceeds from the reflection point P' of the back reflection surface 22 and is incident on the reflection point P of the front reflection surface 21, and a reflection angle $\theta ref$ of the optical axis Xb of the optical display image 4 at the reflection point P'. Furthermore, the wedge angle $\Delta\theta$ satisfies the following equation (2) between a refraction angle $\theta r'$ of the optical axis Xb of the optical display image 4, which is refracted at the front reflection surface 21 and proceeds to the reflection point P', and the reflection angle $\theta ref$ of the optical axis Xb of the optical display image 4 at the reflection point P'. Therefore, the following equation (3) is derived from the following equations (1) and (2).

$$\theta r = \theta ref + \Delta\theta \qquad \text{Equation (1)}$$

$$\theta r' = \theta ref - \Delta\theta \qquad \text{Equation (2)}$$

$$\Delta\theta = (\theta r - \theta r')/2 \qquad \text{Equation (3)}$$

Furthermore, because of the Snell's law, the incident angle $\theta r$ and the refraction angle $\theta r'$ satisfy the following equation (4) among the incident angle $\theta i$ of the optical axis Xf of the optical display image 4, which proceeds from the projector 10 and is incident on the reflection point P, the incident angle $\theta i'$ of the optical axis Xb of the optical display image 4, which proceeds from the projector 10 and is incident on the reflection point P', and a refraction index n of the combiner 20.

$$n = \sin\theta i/\sin\theta r = /\sin\theta i'/\sin\theta r' \qquad \text{Equation (4)}$$

Here, a distance between a refraction point P''' of the front reflection surface 21 along the optical axis Xb of the optical display image 4, which is outputted from the refraction point P''' of the front reflection surface 21 to the reflection point P', and the reflection point P, is denoted by reference sign D, and a distance between a perpendicular point H of the front reflection surface 21, which is perpendicular from the reflection point P', and the reflection point P' is denoted by reference sign d. In such a case, the following equation (5) is satisfied between the distance D and the distance d. Furthermore, a distance from the projector 10 to the reflection point P is denoted by La. In such a case, the following equation (6) is satisfied between the distance D and the distance La. Therefore, the following equation (7) is derived from the following equations (5) and (6).

$$D = d \cdot (\tan \theta r + \tan \theta r') \quad \text{Equation (5)}$$

$$D/\sin(\theta i - \theta i') = La/\sin(\theta i' + 90°) \quad \text{Equation (6)}$$

$$d \cdot (\tan \theta r + \tan \theta r') = La \cdot \sin(\theta i - \theta i')/\cos \theta i' \quad \text{Equation (7)}$$

With the above knowledge, when the distance La, the distance d, the incident angle θi, and the refraction index n are provided among the above variables, the incident angle θr and the refraction angle θr' can be obtained based on the above equations (4) and (7), and the wedge angle Δθ can be set based on the above equation (3).

(Setting of Curvature)

In FIG. 3, a dot-dot-dash line Lf indicates a principal ray that is projected from an end E of the front surface virtual image 4I, which is located at an imaging point of the front surface virtual image 4I, to the predicted eye point 9a. Furthermore, a dot-dot-dash line Ld indicates a principal ray that is projected from an end E' of the back surface virtual image 4I', which is located adjacent to the end E of the front surface virtual image 4I at an imaging point of the back surface virtual image 4I', to the predicted eye point 9a. In the present embodiment, particularly, a radius of curvature R of the front reflection surface 21 at the reflection point P, and a radius of curvature R' of the back reflection surface 22 at the reflection point P' are set such that the principal ray Lf and the principal ray Ld are overlapped with reach other (are coincided with each other) and are thereby coaxial to each other, as shown in FIG. 3.

Specifically, a focal length for implementing a conjugate relationship between the projector 10 and the front surface virtual image 4I is denoted by reference sign f, and a length from the reflection point P to the imaging point of the front surface virtual image 4I is denoted by reference sign Lb. In such a case, the following equation (8) is satisfied between the length f and the length Lb.

$$1/f = 1/La + 1/Lb \quad \text{Equation (8)}$$

Furthermore, a focal length for implementing a conjugate relationship between the projector 10 and the back surface virtual image 4I' is denoted by reference sign f'. A value, which is obtained by dividing a distance between the reflection point P and the reflection point P' by the refraction index n, is subtracted from a distance from the reflection point P to the imaging point of the back surface virtual image 4I' to obtain an air conversion length Lb'. In such a case, the following equation (9) is satisfied between the length f' and the length Lb'. Here, reference sign La' of the following equation (9) is the air conversion length from the projector 10 to the reflection point P' through the refraction point P''' and is expressed by the following equation (10).

$$1/f' = 1/La' + 1/Lb' \quad \text{Equation (9)}$$

$$La' = d/\{\cos(\theta ref - \Delta\theta) \cdot n\} + (La - D \cdot \sin \theta i)/\cos(\theta i - \theta i') \quad \text{Equation (10)}$$

Furthermore, in order to overlap the principal ray Lf, which is projected from the upper end E of the front surface virtual image 4I to the predicted eye point 9a, and the principal ray Ld, which is projected from the upper end E' of the back surface virtual image 4I' to the predicted eye point 9a, with each other to coaxially arrange the principal ray Lf and the principal ray Ld, it is only required that an angle φ of the principal ray Lf relative to the overlapped optical axes of the optical display image 4 reflected from the reflection surfaces 21, 22, respectively, (specifically, the optical axis Xb of the optical display image 4, which is reflected by the back reflection surface 22 and is outputted from the front reflection surface 21, and the optical axis Xf of the optical display image 4, which is reflected by the front reflection surface 21) is set to be identical to an angle φ' of the principal ray Ld relative to the overlapped optical axes of the optical display image 4 reflected from the reflection surfaces 21, 22, respectively. Therefore, the following equation (11) is satisfied. Here, reference sign Lc of the following equation (11) denotes a length from the imaging point of the front surface virtual image 4I to the predicted eye point 9a, and reference sign Lc' of the following equation (11) denotes a length from the imaging point of the back surface virtual image 4I' to the predicted eye point 9a.

$$(Lb/La)/Lc = (Lb'/La')/Lc' \quad \text{Equation (11)}$$

With the above knowledge, when the length La and the length Lb are provided, the focal length f of the image reflected through the front surface reflection can be obtained based on the above equation (8), and the radius of curvature R, which satisfies the focal length f, can be set at the front reflection surface 21. Additionally, when the length La, the length Lb, the length Lc, the length Lc' and the above described variables used in the setting of the wedge angle are provided in addition to the obtained focal length f, the focal length f' of the image reflected through the back surface reflection can be obtained based on the above equations (9), (10) and (11), and the radius of curvature R', which satisfies the focal length f', can be set at the back reflection surface 22.

Figure 4:
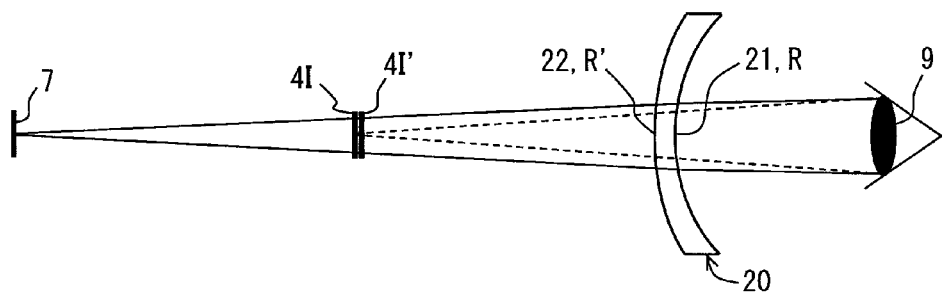
FIG. 4 is a schematic diagram for describing characteristics of the HUD device of FIG. 1.

In the present embodiment, which satisfies the equation (11), the radius of curvature R of the front reflection surface 21, which is configured into the form of the curved concave surface as shown in FIGS. 3 and 4, is set to be smaller than the radius of curvature R' of the back reflection surface 22, which is configured into the form of the curved convex surface. Specifically, the radius of curvature R of the front reflection surface 21 at the reflection point P of the front reflection surface 21, at which the optical axis Xf of the optical display image 4 reflected by the front reflection surface 21 is located, is set to be smaller than the radius of curvature R' of the back reflection surface 22 at the reflection point P' of the back reflection surface 22, at which the optical axis Xb of the optical display image 4 reflected by the back reflection surface 22 is located. Thereby, the concave lens effect is implemented. Thus, the imaging point of the external image 7, which is visually recognized through the combiner 20, becomes further from the imaging point of the front surface virtual image 4I and the imaging point of the back surface virtual image 4I'.

In the above description, there are exemplified the relationship between the radius of curvature R of the front reflection surface 21 at the reflection point P of the front reflection surface 21, at which the optical axis Xf of the optical display image 4 reflected by the front reflection surface 21 is located, and the radius of curvature R' of the back reflection surface 22 at the reflection point P' of the back reflection surface 22 (i.e., the reflection point that corresponds to the reflection point P), at which the optical axis Xb of the optical display image 4 reflected by the back reflection surface 22 is located. However, a relationship between a radius of curvature of the front reflection surface 21 at any other reflection point of the front reflection surface 21 and a radius of curvature of the back reflection surface 22 at a corresponding reflection point, which corresponds to this reflection point of the front reflection surface 21, may be similar to the relationship between the radius of curvature R at the reflection point P and the radius of curvature R' a the reflection point P'.

The effects and advantages of the HUD device 1 discussed above will be described.

In the HUD device 1, the optical axis Xf, which extends from the front reflection surface 21 of the combiner 20 located at the cabin side to the predicated eye point 9a of the occupant 8, and the optical axis Xb, which extends from the back reflection surface 22 of the combiner 20 located at the outdoor side to the predicted eye point 9a, are overlapped with each other. Therefore, the visual misalignment between the front surface virtual image 4I, which is visually recognized through the reflection at the front reflection surface 21, and the back surface virtual image 4I', which is visually recognized through the reflection at the back reflection surface 22, can be limited along the overlapped optical axes. Furthermore, in the HUD device 1, the radius of curvature R of the front reflection surface 21, which is configured into the form of the curved concave surface, is smaller than the radius of curvature R' of the back reflection surface 22, which is configured into the form of the curved convex surface. Therefore, the imaging point of the external image 7, which is visually recognized through the combiner 20, becomes further from the imaging point of the front surface virtual image 4I and the imaging point of the back surface virtual image 4I' due to the concave lens effect. As a result, it is easy for the occupant 8 to simultaneously and visually recognize the external image 7, which has the further imaging point, while focusing on the imaging point of the front surface virtual image 4I and the imaging point of the back surface virtual image 4I'. Accordingly, the simultaneous visual recognition capability for the optical display image 4, which is displayed as the virtual images 4I, 4I', and the external image 7 can be improved.

Figure 5:
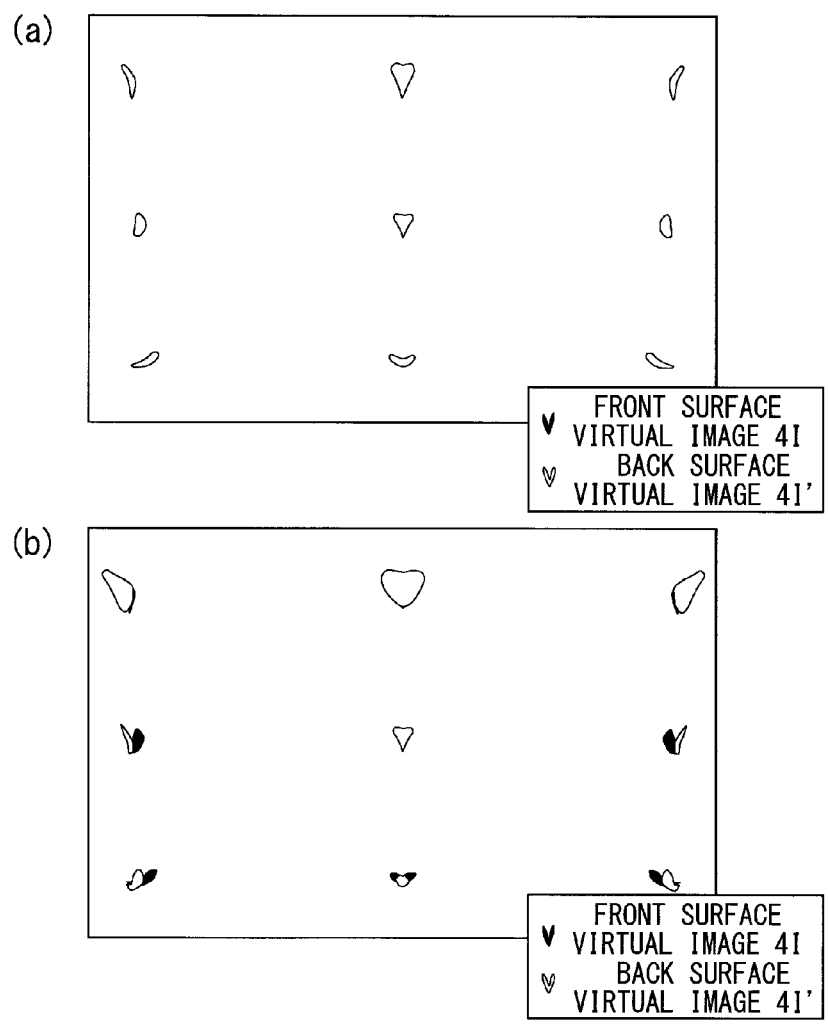
FIG. 5(*a*) is a schematic diagram showing a front surface virtual image and a back surface virtual image formed at the HUD device of FIG. 1, and FIG. 5(*b*) is a schematic diagram showing a front surface virtual image and a back surface virtual image formed in an HUD device of a comparative example.

Furthermore, in the HUD device 1, the principal ray Lf, which is projected from the upper end E of the front surface virtual image 4I (the front surface virtual image 4I being visually recognized through the reflection by the front reflection surface 21) to the predicted eye point 9a, overlaps with the principal ray Ld, which is projected from the upper end E' of the back surface virtual image 4I' (the back surface virtual image 4I' being visually recognized through the reflection by the front reflection surface 21) to the predicted eye point 9a. Therefore, the visual misalignment between the virtual images 4I, 4I' caused by a difference in an image magnification ratio is limited on the principal rays Lf, Ld of the virtual images 4I, 4I'. Unlike the comparative example of FIG. 5(b), in which the principal rays are not overlapped with each other, the imaging point of the back surface virtual image 4I' and the imaging point of the front surface virtual image 4I can be correctly overlapped with each other in the HUD device 1 of the FIG. 5(a), in which the principal rays are overlapped with each other. Therefore, the visual recognition capability for the optical display image 4, which is visually recognized simultaneously with the external image 7, can be improved.

Furthermore, in the HUD device 1, the wedge angle Δθ is held between the tangent line C, which extends through the reflection point P of the reflection surface 21 located along the optical axis Xf, and the tangent line C', which extends through the reflection point P' of the reflection surface 22 located along the optical axis Xf. Therefore, the optical axis Xf, which proceeds from the reflection surface 21 to the predicted eye point 9a, and the optical axis Xb, which proceeds from the reflection surface 22 to the predicted eye point 9a, are reliably overlapped with each other, and thereby the visual misalignment between the virtual images 4I, 4I' along the overlapped optical axes can be limited.

Although the present disclosure has been described with respect to the above embodiment, the present disclosure is not limited to the above embodiment. The present disclosure may be applied to various other embodiments within a principal of the present disclosure.

Specifically, in a first modification, the principal ray Lf, which is projected from the end E of the virtual image 4I to the predicted eye point 9a, and the principal ray Ld, which is projected from the end E' of the virtual image 4I' to the predicted eye point 9a, may be misaligned with each other within such an extent that the radius of curvature R of the front reflection surface 21, which is configured into the form of the curved concave surface, is kept smaller than the radius of curvature R' of the back reflection surface 22, which is configured into the form of the curved convex surface. Furthermore, in a second modification, instead of forming the display member by the combiner 20, which is a separate element that is separated from the windshield 5, the display member may be formed by a portion of the windshield 5. Furthermore, in a third modification, the present disclosure may be applied to various other types of vehicles (transportation apparatuses), such ships or airplanes besides the automobile 2.

What is claimed is:
1. A head-up display device, comprising:
a display member that transmits an external image located at an outside of a cabin of a vehicle to enable visual recognition of the external image by an occupant located in an inside of the cabin; and
a projector that projects an optical display image onto the display member to display a virtual image of the optical display image in a manner that enables visual recognition of the virtual image by the occupant, wherein:
the display member includes:
  a front reflection surface, which is in a form of a curved concave surface and forms a front surface virtual image as the virtual image by reflecting the optical display image at a side of the display member where the inside of the cabin is located; and
  a back reflection surface, which is in a form of a curved convex surface and forms a back surface virtual image as the virtual image by reflecting the optical display image at another side of the display member where the outside of the cabin is located;
an optical axis of the optical display image, which is reflected by the back reflection surface and is outputted from the front reflection surface, and an optical axis of the optical display image, which is reflected by the front reflection surface, are coaxial with each other and extend to a predicted eye point, which is predicted in advance as an eye point of the occupant;
a radius of curvature of the front reflection surface at a reflection point of the front reflection surface, at which the optical axis of the optical display image reflected by the front reflection surface is located, is smaller than a radius of curvature of the back reflection surface at a reflection point of the back reflection surface, at which the optical axis of the optical display image reflected by the back reflection surface is located;
a tangent line, which is tangent to the reflection point of the front reflection surface in a cross section of the display member including both of the reflection point of the front reflection surface and the reflection point of the back reflection surface, and a tangent line, which is tangent to the reflection point of the back reflection surface in the cross section of the display member including both of the reflection point of the front reflec- tion surface and the reflection point of the back reflection surface, cross with each other at a predetermined angle;

a principal ray, which is projected from an end of the front surface virtual image located at an imaging point of the front surface virtual image to the predicted eye point, is coaxial with a principal ray, which is projected from an end of the back surface virtual image located adjacent to the end of the front surface virtual image at an imaging point of the back surface virtual image to the predicted eye point; and each of the principal ray, which is projected from the end of the front surface virtual image located at the imaging point of the front surface virtual image to the predicted eye point, and the principal ray, which is projected from the end of the back surface virtual image located adjacent to the end of the front surface virtual image at the imaging point of the back surface virtual image to the predicted eye point, define an identical angle relative to both of the optical axis of the optical display image, which is reflected by the back reflection surface and is outputted from the front reflection surface, and the optical axis of the optical display image, which is reflected by the front reflection surface; and the radius of curvature of the back reflection surface is set to form a focal length, which implements a conjugate relationship between the projector and the back surface virtual image while the focal length is obtained based on the following three equations:

$$1/f' = 1/La' + 1/Lb'$$

$$La' = d/\{\cos(\theta ref - \Delta\theta)\cdot n\} + (La - D\cdot\sin\theta i)/\cos(\theta i - \theta i')$$

$$(Lb/La)/Lc = (Lb'/La')/Lc'$$

where n denotes a refraction index of the display member;
$\Delta\theta$ denotes the predetermined angle;
$\theta i$ denotes an incident angle that is measured at the front reflection surface and is of the optical axis of the optical display image, which proceeds from the projector and is incident on the reflection point of the front reflection surface;
$\theta i'$ denotes an incident angle that is measured at the front reflection surface and is of the optical axis of the optical display image, which proceeds from the projector and is incident on the reflection point of the back reflection surface;
$\theta ref$ denotes a reflection angle of the optical axis of the optical display image at the reflection point of the back reflection surface;
La denotes a distance from the projector to the reflection point of the front reflection surface;
La' denotes an air conversion length from the projector to the reflection point of the back reflection surface through a refraction point of the front reflection surface along the optical axis of the optical display image, which is outputted from the refraction point of the front reflection surface to the reflection point of the back reflection surface;
Lb denotes a length from the reflection point of the front reflection surface to the imaging point of the front surface virtual image;
Lb' denotes an air conversion length that is obtained by subtracting a value, which is obtained by dividing a distance between the reflection point of the front reflection surface and the reflection point of the back reflection surface by the refraction index, from a distance from the reflection point of the front reflection surface to the imaging point of the back surface virtual image;
Lc denotes a length from the imaging point of the front surface virtual image to the predicted eye point;
Lc' denotes a length from the imaging point of the back surface virtual image to the predicted eye point;
D denotes a distance between the refraction point of the front reflection surface and the reflection point of the front reflection surface; and
d denotes a distance between a perpendicular point of the front reflection surface, which is perpendicular from the reflection point of the back reflection surface, and the reflection point of the back reflection surface; and
f' denotes the focal length for implementing the conjugate relationship between the projector and the back surface virtual image.

2. The head-up display device according to claim 1, wherein the display member is a combiner that is made of transparent resin and is configured into a plate form.

3. The head-up display device according to claim 2, wherein the combiner is configured into a wedge form that has a thickness, which continuously increases from a lower end toward an upper end of the wedge form in a top-to-bottom direction.

4. A combiner for a head-up display device, wherein the combiner is placed along an optical axis of an optical display image, which is projected from a projector of the head-up display device, the combiner comprising:

a front reflection surface that is in a form of a curved concave surface and is located at one side of the combiner where a cabin of a vehicle is located, wherein the front reflection surface forms a front surface virtual image to be recognized by an occupant of the vehicle by reflecting the optical display image projected from the projector; and a back reflection surface that is in a form of a curved convex surface and is located at another side of the combiner where an outside of the cabin of the vehicle is located, wherein the back reflection surface forms a back surface virtual image to be recognized by the occupant of the vehicle by reflecting the optical display image projected from the projector, wherein:

an optical axis of the optical display image, which is reflected by the back reflection surface and is outputted from the front reflection surface, and an optical axis of the optical display image, which is reflected by the front reflection surface, are coaxial with each other and extend to a predicted eye point, which is predicted in advance as an eye point of the occupant;

a radius of curvature of the front reflection surface at a reflection point of the front reflection surface, at which the optical axis of the optical display image reflected by the front reflection surface is located, is smaller than a radius of curvature of the back reflection surface at a reflection point of the back reflection surface, at which the optical axis of the optical display image reflected by the back reflection surface is located;

a tangent line, which is tangent to the reflection point of the front reflection surface in a cross section of the combiner including both of the reflection point of the front reflection surface and the reflection point of the back reflection surface, and a tangent line, which is tangent to the reflection point of the back reflection surface in the cross section of the combiner including both of the reflection point of the front reflection surface and the reflection point of the back reflection surface, cross with each other at a predetermined angle;

a principal ray, which is projected from an end of the front surface virtual image located at an imaging point of the front surface virtual image to the predicted eye point, is coaxial with a principal ray, which is projected from an end of the back surface virtual image located adjacent to the end of the front surface virtual image at an imaging point of the back surface virtual image to the predicted eye point; and each of the principal ray, which is projected from the end of the front surface virtual image located at the imaging point of the front surface virtual image to the predicted eye point, and the principal ray, which is projected from the end of the back surface virtual image located adjacent to the end of the front surface virtual image at the imaging point of the back surface virtual image to the predicted eye point, define an identical angle relative to both of the optical axis of the optical display image, which is reflected by the back reflection surface and is outputted from the front reflection surface, and the optical axis of the optical display image, which is reflected by the front reflection surface; and the radius of curvature of the back reflection surface is set to form a focal length, which implements a conjugate relationship between the projector and the back surface virtual image while the focal length is obtained based on the following three equations:

$1/f' = 1/La' + 1/Lb'$ $La' = d/\{\cos(\theta ref - \Delta\theta) \cdot n\} + (La - D \cdot \sin\theta i)/\cos(\theta i - \theta i')$ $(Lb/La)/Lc = (Lb'/La')/Lc'$ where n denotes a refraction index of the combiner;
$\Delta\theta$ denotes the predetermined angle;
$\theta i$ denotes an incident angle that is measured at the front reflection surface and is of the optical axis of the optical display image, which proceeds from the projector and is incident on the reflection point of the front reflection surface;
$\theta i'$ denotes an incident angle that is measured at the front reflection surface and is of the optical axis of the optical display image, which proceeds from the projector and is incident on the reflection point of the back reflection surface;
$\theta ref$ denotes a reflection angle of the optical axis of the optical display image at the reflection point of the back reflection surface;
La denotes a distance from the projector to the reflection point of the front reflection surface;
La' denotes an air conversion length from the projector to the reflection point of the back reflection surface through a refraction point of the front reflection surface along the optical axis of the optical display image, which is outputted from the refraction point of the front reflection surface to the reflection point of the back reflection surface;
Lb denotes a length from the reflection point of the front reflection surface to the imaging point of the front surface virtual image;
Lb' denotes an air conversion length that is obtained by subtracting a value, which is obtained by dividing a distance between the reflection point of the front reflection surface and the reflection point of the back reflection surface by the refraction index, from a distance from the reflection point of the front reflection surface to the imaging point of the back surface virtual image;
Lc denotes a length from the imaging point of the front surface virtual image to the predicted eye point;
Lc' denotes a length from the imaging point of the back surface virtual image to the predicted eye point;
D denotes a distance between the refraction point of the front reflection surface and the reflection point of the front reflection surface; and
d denotes a distance between a perpendicular point of the front reflection surface, which is perpendicular from the reflection point of the back reflection surface, and the reflection point of the back reflection surface; and
f' denotes the focal length for implementing the conjugate relationship between the projector and the back surface virtual image.

5. The combiner according to claim 4, wherein the combiner is made of transparent resin and is configured into a plate form.

6. The combiner according to claim 5, wherein the combiner is configured into a wedge form that has a thickness, which continuously increases from a lower end toward an upper end of the wedge form in a top-to-bottom direction.

* * * * *